United States Patent
Komatsu

(10) Patent No.: US 8,464,015 B2
(45) Date of Patent: Jun. 11, 2013

(54) ARITHMETIC PROCESSING DEVICE AND DATA ERASING METHOD

(75) Inventor: Kiyoshi Komatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 98 days.

(21) Appl. No.: 13/233,358

(22) Filed: Sep. 15, 2011

(65) Prior Publication Data

US 2012/0005417 A1    Jan. 5, 2012

Related U.S. Application Data

(63) Continuation of application No. PCT/JP2009/001223, filed on Mar. 18, 2009.

(51) Int. Cl.
*G06F 12/00* (2006.01)
*G06F 13/00* (2006.01)
*G06F 13/28* (2006.01)
*G06F 11/00* (2006.01)
*G06F 12/14* (2006.01)
*G06F 12/16* (2006.01)

(52) U.S. Cl.
USPC .......... 711/166; 726/22; 726/26; 726/34; 726/36

(58) Field of Classification Search
USPC .......... 711/166; 726/22, 26, 34, 36
See application file for complete search history.

(56) References Cited

U.S. PATENT DOCUMENTS

| | | | | |
|---|---|---|---|---|
| 5,131,040 A | * | 7/1992 | Knapczyk | 380/277 |
| 6,292,898 B1 | * | 9/2001 | Sutherland | 726/34 |
| 6,351,287 B1 | * | 2/2002 | Sakaegi et al. | 348/372 |
| 2006/0278701 A1 | * | 12/2006 | Matsushita et al. | 235/382 |
| 2009/0204840 A1 | * | 8/2009 | Sakamoto et al. | 713/340 |
| 2012/0129596 A1 | * | 5/2012 | Thackston | 463/29 |

FOREIGN PATENT DOCUMENTS

| | | |
|---|---|---|
| JP | 2003-288273 | 10/2003 |
| JP | 2005-176024 | 6/2005 |
| JP | 2006-344112 | 12/2006 |
| JP | 2007-036672 | 2/2007 |

OTHER PUBLICATIONS

International Search Report for PCT/JP/2009/001223 mailed Apr. 21, 2009.

* cited by examiner

*Primary Examiner* — Michael Alsip
(74) *Attorney, Agent, or Firm* — Staas & Halsey LLP

(57) ABSTRACT

Predetermined information is received from an external device and when receiving the information, an area in which the data stored in the first memory shall be erased is determined corresponding to a battery residual quantity of a power supply unit of the arithmetic processing device, and a data erasing process is controlled and executed with respect to the thus-determined area.

14 Claims, 6 Drawing Sheets

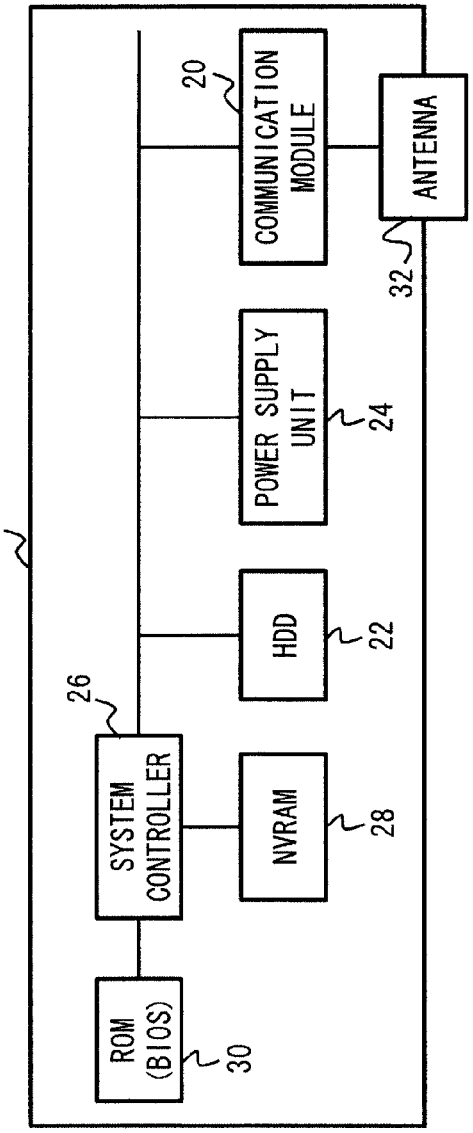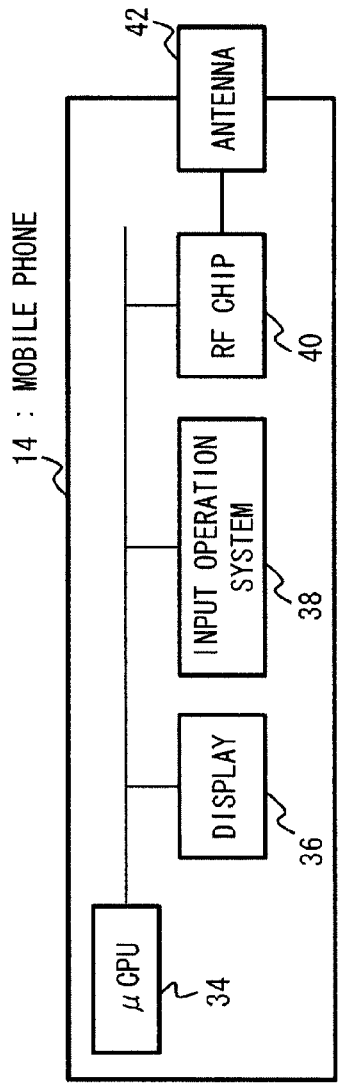

ARITHMETIC PROCESSING DEVICE AND DATA ERASING METHOD

CROSS-REFERENCE TO RELATED APPLICATIONS

This is a continuation of Application PCT/JP2009/001223, filed on Mar. 18, 2009, now pending, the entire contents of which are incorporated herein by reference.

FIELD

The present invention relates to a portable arithmetic processing device mounted with a readable/writable memory, a data erasing method of erasing data in the memory of the arithmetic processing device, a program which makes the arithmetic processing device execute a process of erasing the data in the memory of the arithmetic processing device, a storage medium stored with this program, and a remote operation system for data erase of erasing, through a remote operation, the data in the memory of the arithmetic processing device.

BACKGROUND

Nowadays, a portable arithmetic processing device such as a so-called notebook personal computer (PC) is capable of storing multiple items of data in a memory of a hard disk etc. Management of the data stored in the hard disk etc such as this is put into hands of a purchaser and a user. Supposing a case that this arithmetic processing device gets separated from hands of the purchaser or the user, the purchaser or the user sets a scheme that apiece of information such as a password is requested of another person (third party) in order to prevent this another person from easily accessing the data when starting up OS (Operating System) and BIOS (Basic Input Output System).

Even when security of the data in the memory can be enhanced by the information such as the password, however, the data can be accessed by stealing the information such as the password. Therefore, the data security can not be ensured perfectly even by enhancing the security of the data in the memory through the password.

FIG. 6 is a flowchart showing a simplified illustration of a conventional method of remotely processing the data in order to ensure the data security.

To start with, the arithmetic processing device receives information to delete the data from a user's mobile terminal device via a telephone communication network (step S100). The arithmetic processing device is thereby automatically booted (step S102).

Next, it is determined whether or not a condition for erasing the data is fulfilled, e.g., whether or not there is information indicating that the arithmetic processing device is stolen, etc (step S104). If a result of the determination is affirmative (YES), a data erasing process is carried out (step S106). Upon finishing the data erasing process, the arithmetic processing device is shut down (shutdown) (step S108). Note that whereas if the result of the determination in step S104 is negative (NO), the arithmetic processing device is promptly shut down (step S108). Thus, the data erasing process is executed.

Further, the following Patent document 1 describes a system given below for ensuring the data security of the notebook PC.

To be specific, a center device at a mobile terminal monitor center is always notified of a present location of the notebook PC possessed by the user and a present location of the mobile terminal device that is carried by the user at all times via the network. When detecting that a distance calculated by the center device between the mobile terminal device and the notebook PC becomes equal to or larger than a preset fixed distance, an operator immediately notifies the mobile terminal device of alarm information saying this purport from a telephone for a call center. Further, the user issues an instruction to delete the data on the notebook PC separated at a fixed or longer distance, and the telephone for the call center accepts this instruction, in which case the center device transmits a delete command signal to the notebook PC via the network, thereby deleting the data on the notebook PC.

With this operation, it is considered that a theft and a loss of the notebook PC possessed by the user can be monitored, and the data can be prevented from leaking out and flowing out when stolen and lost.

In the system of the Patent document 1, an instruction signal is transmitted for deleting the data on the notebook PC. The perfect deletion of the data on the notebook PC, however, requires a given period of processing time and a sufficient battery quantity. Therefore, even when the notebook PC receives the instruction signal and starts processing, there is a case in which the data is not completely erased due to restrictions on the processing time and on the battery quantity with the result that the data is still partially left. This leads to a problem that there still remains a possibility of leaking and flowing the data out.

[Patent document 1] Japanese Patent Application Laid-Open Publication No. 2007-36672

SUMMARY

In one embodiment of a present invention;

(A) predetermined information is received from an external device; and (B) when receiving the information, an area in which the data stored in the first memory shall be erased is determined corresponding to a battery residual quantity of a power supply unit of the arithmetic processing device, and a data erasing process is controlled and executed with respect to the thus-determined area.

The embodiment given above can be accomplished by a program which makes the arithmetic processing device execute the data erasing method described above. This program is stored on a non-transitory computer readable medium of a computer and thus provided.

Furthermore, the embodiment given above can be also accomplished by the following remote operation system for data erase of erasing, through a remote operation, data in a first readable/writable memory mounted on an arithmetic processing device. This system includes a mobile device and an arithmetic processing device.

(C) The mobile device has a function of transmitting predetermined information.

(D) The arithmetic processing device includes the following respective units (D1)-(D4). Namely, the arithmetic processing device includes:

(D1) a communication control unit to receive instruction information transmitted from the mobile device;

(D2) a data storage unit to include a first data readable/writable memory;

(D3) a power supply unit to drive the arithmetic processing device; and (D4) a control unit to determine, when receiving the information, an area in which the data stored in the first memory shall be erased corresponding to a battery residual quantity of the power supply unit and controlling and executing a data erasing process with respect to the thus-determined area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A is a diagram illustrating a device configuration of the notebook PC in the remote operation system depicted in FIG. 1.

FIG. 2B is a diagram illustrating a device configuration of a mobile phone in the remote operation system depicted in FIG. 1.

DESCRIPTION OF EMBODIMENT

Figure 1:
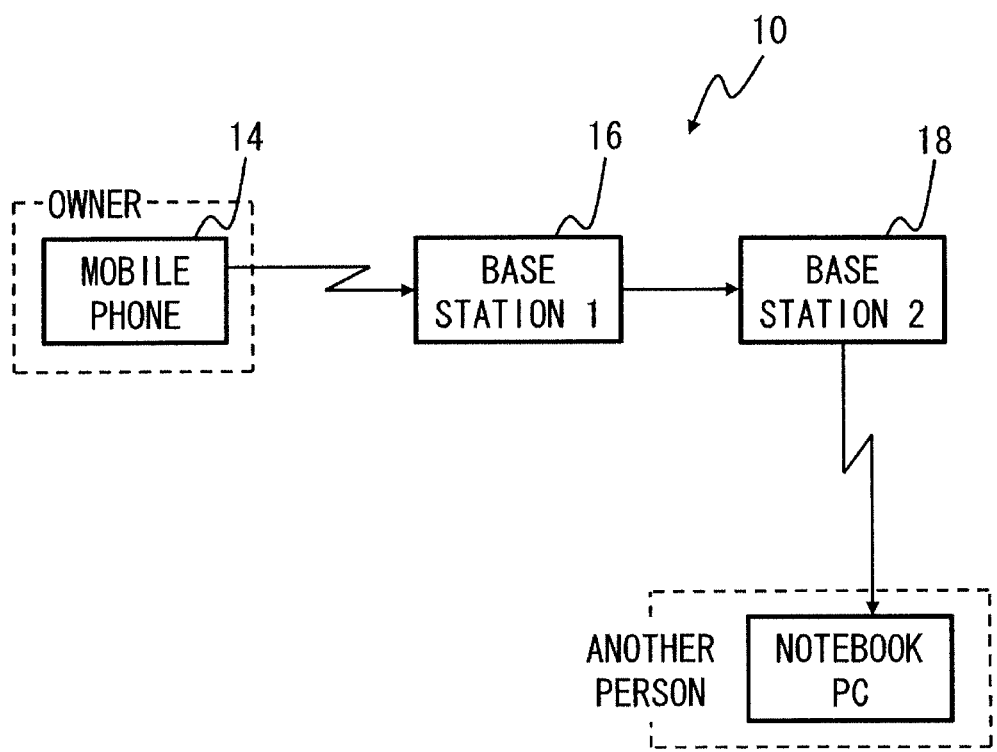
FIG. 1 is a diagram illustrating an outline of a remote operation system which erases data within a notebook PC byway of one embodiment of the remote operation system according to the present invention.

In-depth descriptions of an arithmetic processing device, a data erasing method, a program, a storage medium and a remote operation system according to the present invention will hereinafter be made. FIG. 1 is a diagram illustrating an outline of a remote operation system 10 which erases data of a notebook PC (Personal Computer). A discussion on the present embodiment will proceeds by exemplifying a notebook PC 12, however, it is feasible to apply, without being limited to the notebook PC, a PDA (Personal Digital Assistant) which deals with such categories of information as a schedule, an address book or a memorandum on a portable basis and further a mobile phone itself.

(System Architecture)

The remote operation system 10 is configured by including a notebook PC (which will hereinafter be simply referred to as the PC) 12, a mobile phone 14 and base stations 16, 18.

The remote operation system 10, when the mobile phone 14 transmits a predetermined item of information for erasing data to the PC 12, selects a data erasing method corresponding to a residual quantity of a battery of the PC 12 and surely erases the data at high efficiency.

FIG. 2A is a diagram showing an outline of a configuration of the PC 12, and FIG. 2B is a diagram illustrating an outline of a configuration of the mobile phone 14.

The PC 12 is a possession of an owner A, however, an assumption is that the PC 12 is in a status of being stolen, occupied, and shut down by another person. The PC 12 is a portable arithmetic processing device mounted with a readable/writable memory. The owner of the PC 12 always carries and possesses the mobile phone 14.

The PC 12 includes, as illustrated in FIG. 2A, a communication module 20, a data storage unit 22, a power supply unit 24, a system controller 26, a NVRAM (Non-Volatile RAM) 28, a ROM 30 and an antenna 32.

The communication module 20 is configured in a communication-enabled status with the base station 18 and is also configured to be enabled to receive the information from the mobile phone 14 via the base stations 16, 18 and the antenna 32.

The communication module 20 and the system controller 26 of the PC 12 are set always in a standby status while being supplied with the power of the power supply unit 24 to receive a predetermined item of incoming information even when the PC is in a shutdown status. When receiving the incoming information, the system controller 26 is configured to start a data erasing process by reading BIOS from the ROM 30 and invoking the information written to the NVRAM 28 according to the necessity.

The antenna 32 connected to the communication module 20 receives the predetermined information transmitted from the mobile phone 14 via the base stations 16, 18.

The data storage unit 22 includes a hard disk from and to which the data of the PC 12 can be read and written. The power supply unit 24 supplies the power to the respective units of the PC 12, thereby driving these units. The power supply unit 24 is configured to have a chargeable internal battery and is further configured to be supplied with the power from an external power supply by use of AC (alternating current).

The system controller 26, when the communication module 20 receives the information from the mobile phone 14, controls and executes an erasing process of determining a memory area in which to erase the stored data on the hard disk of the data storage unit 22 in a way that corresponds to the residual quantity of the internal battery of the power supply unit 24, and, after executing the data erasing process, shuts down the PC 12. Herein, the "erasing process" embraces, as will be discussed later on, a process of shutting down the PC 12 after executing the erasing process with respect to a part of data area within a partition (or a segment) corresponding to the residual quantity of the battery in addition to the erasing process executed with respect to the area recorded with pieces of partition information of a plurality of partitions into which the memory is partitioned and the erasing process executed with respect to the data area within each partition. In the case of shutting down after executing the erasing process with respect to a part of data area, the remaining data area continues to undergo the erasing process when the internal battery of the power supply unit 24 gets sufficiently charged to reboot the PC 12 or when the PC 12 is supplied with the power from the AC power supply and is thus rebooted.

Note that the "shutdown" of the PC 12 connotes that BIOS shuts down, and the communication module 20 and the system controller 26 return to the standby status. In the following discussion, the "shutdown" also connotes the return to the standby status.

The mobile phone 14 includes a μCPU 34, a display 36, an input operation system 38, a radio frequency (RF) chip 40 and an antenna 42.

The owner inputs a content of transmission by depressing a bottom etc of the input operation system 38 while viewing a display screen of the display 36 in order to transmit the predetermined information to the PC 12 that is stolen and occupied by another person. Through this operation, the setting is done to transmit the predetermined information. The predetermined information is transmitted toward the PC 12 via the RF chip 40 and the antenna 42. These processes are executed by the µCPU 34 in the way of being handled under the control of this µCPU 34. The predetermined information, for example, is defined as telephone number information of the mobile phone 14.

(Flow of Notification of Telephone Number Information)

Figure 3:
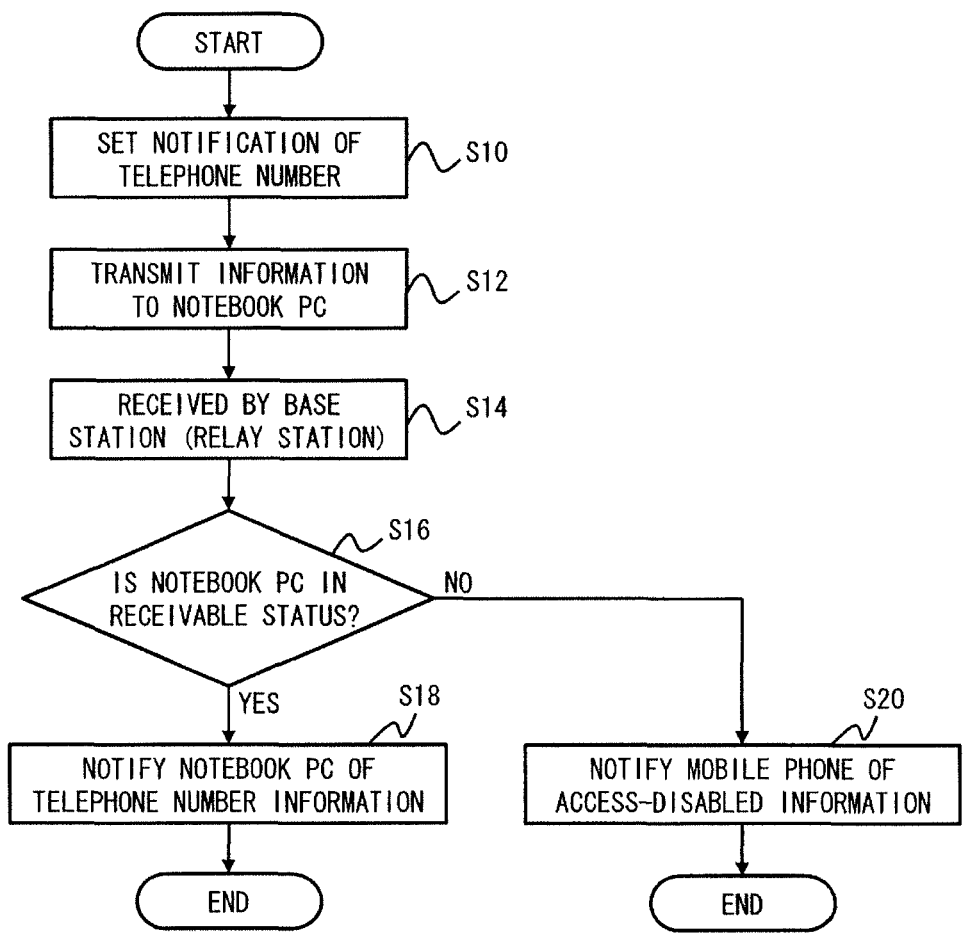
FIG. 3 is a flowchart illustrating a processing flow on an owner side in the remote operation system depicted in FIG. 1.

FIG. 3 shows a flow of transmitting notification information for making a start of erasing the data to the PC 12 from the mobile phone 14 in order to erase the data in the storage unit 22 of the PC 12.

To begin with, the telephone number information is set in order for the mobile phone 14 to notify the PC 12 of erasing the data (step S10). Next, the telephone number information is transmitted to the PC 12 as an incoming target device (destination device; recipient) (step S12). The telephone number information is received by the base station 18 via the base station 16 (step S14). The base station 18 determines whether the PC 12 is in a receivable status or not (step 16). It can be checked whether in the receivable status or not on the basis of the present positional information of the PC 12 and whether a response to an access to the PC 12 is given or not.

If a result of the determination is affirmative (YES), the notebook PC 12 is notified of the transmitted telephone number information of the mobile phone 14 (step S18). The PC 12 starts the erasing process on the basis of this notification of the telephone number information.

Whereas if the result of the determination is negative (NO), the mobile phone 14 is notified of reception-disabled information (step S20). In this case, the data erasing process is not started on the PC 12.

(Flow of Erasing Process in PC after Receiving Notification Information)

Figure 4:
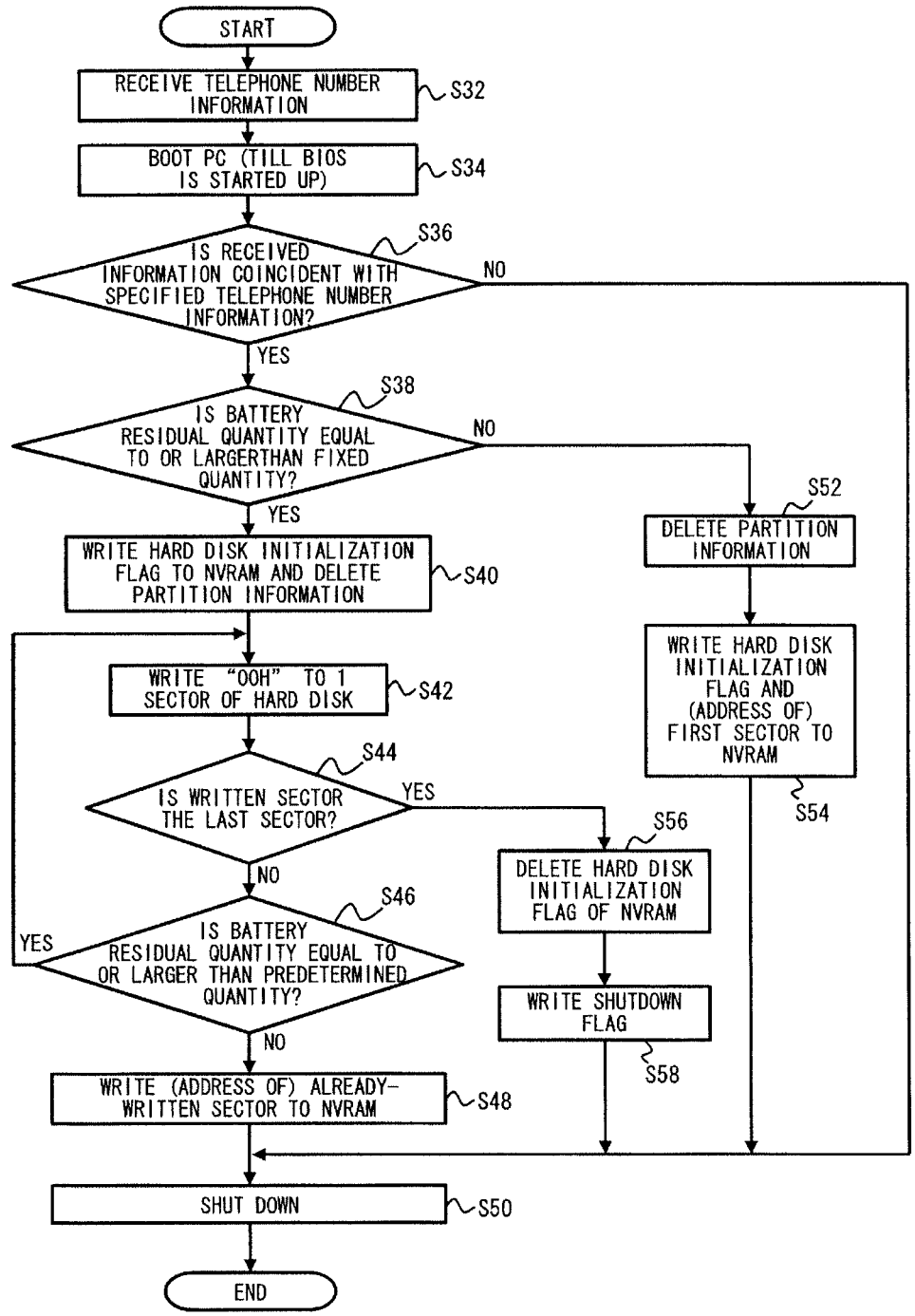
FIG. 4 is a flowchart illustrating a flow of a first half of an erasing process executed within the notebook PC depicted in FIG. 1.

FIG. 4 is a flowchart illustrating a flow of the data erasing process executed in the PC 12.

To start with, the communication module 20 receives the telephone number information from the mobile phone 14 (step S32). With this reception, the system controller 26 kept in the standby status reads the BIOS from the ROM 30 and starts up the BIOS (step S34). At this time, the OS is not started up. The BIOS includes an erasing program for executing the erasing process of the hard disk in addition to the program for controlling the input and the output to and from the memory such as the data storage unit 22 to include the hard disk and the NVRAM 28 and further the program for reading the residual quantity of the internal battery of the power supply unit 24. This erasing program is read at a final stage of reading the BIOS. Initiation of the following process is triggered by starting up this erasing program. Namely, the following process is executed without reading and starting up the OS.

At first, it is determined whether the received telephone number information is a specified piece of telephone number information or not (step S36). The NVRAM 28 previously stores the telephone number information of the mobile phone 14 that is registered by the owner, and hence, this stored telephone number information being invoked, it is determined whether the invoked telephone number information is coincident with the received telephone number information or not. With this operation, it is feasible to prevent the initiation of the data erasing process, which is derived from the notification of the invalid telephone number information. If the result of the determination is negative, the PC 12 is shut down (step S50). The "shutdown status" connotes a status in which the communication module 20 and the system controller 26 come to the standby status when supplied with the power from the power supply unit 24 so as to enable the telephone number information to be received at all times similarly to the status before receiving the telephone number information in step S32.

Whereas if the result of the determination is affirmative (YES), it is further determined whether the internal battery of the power supply unit 24 has a sufficient battery residual quantity or not, i.e., whether the battery residual quantity is equal to or larger than a fixed quantity or not (step S38). The fixed quantity to be compared with the battery residual quantity is determined based on the use of a reference table created in the way of previously associating an amount of the erasing process in the hard disk with a battery quantity required at this time. The reference table is recorded on, e.g., the ROM 30.

If the result of this determination is affirmative, the erasing process (initialization process) is conducted in a way that sets an overall area of the hard disk as a shall-be-erased area. On this occasion, at first, after a hard disk initialization flag, which represents that the data on the hard disk is in the process of being erased, has been written to the NVRAM 28, the process of erasing the area stored with the partition information within the hard disk of the data storage unit 22 is executed, i.e., the partition information is deleted (step S40). The "partition information" connotes partition-related information containing system ID information applied to each of the plurality of partitions into which the hard disk is partitioned, a first sector number and a last sector number of the partition, and so on.

Next, the erasing process is executed on a one-sector basis with respect to the data area within the partition of the hard disk. To be specific, "00H" is written on the one-sector basis (step S42). Further, it is determined whether the "00H" written sector is the last sector or not (step S44). If the result of the determination is negative, it is further checked and determined whether the battery residual quantity is still left in the internal battery of the power supply unit 24 or not (step S46). Namely, it is checked by making a comparison with a preset quantity whether or not the power supply unit 24 has the battery residual quantity enough to write "00H" to one sector.

If the result of the determination is affirmative, the processing loops back to step S42, in which "00H" is further written to the neighboring sector on the sector-by-sector basis upon a shift to this neighboring sector. Thus, the erasing process on the sector-by-sector basis is repeated as far as the battery residual quantity permits till reaching a termination of the sectors. If the result of the determination as to the battery residual quantity is negative, address information of the "00H" already-written sector is written as a piece of erasing process information to the NVRAM 28 to which the hard disk initialization flag is written (step S48), and the erasing process is finished. Thereafter, the PC 12 is shut down (step S50).

A reason why the erasing process information is thus written lies in attaining a scheme enabling the data to be completely erased, even if the PC 12 is stolen and has no sufficient battery residual quantity, as will be described later on, by continuing the data erasing process using the erasing process information before another person boots the PC 12 to start up the OS.

The process such as this enables the data to be erased before another person boots the PC 12 when the PC 12 is stolen and even if not supplied with the power from the external power supply.

Note that if the result of the determination in step S38 is negative (if the battery residual quantity is not sufficient), i.e., if the battery residual quantity is smaller than the fixed quantity, the partition information is deleted (step S52). At this time, "00H" is not written to the data area. Thereafter, the hard disk initialization flag, which indicates the information purporting that the data on the hard disk is in the process of being erased, is written to the NVRAM 28, and the address information of the first sector of the shall-be-erased partition is also written as the erasing process information to the NVRAM 28 (step S54), resulting in finishing the erasing process. Thereafter, the PC 12 is shut down (step S50). Thus, the reason why the erasing process information is written lies in attaining the scheme enabling the data to be completely erased, even if the PC 12 is stolen but has no sufficient battery residual quantity, as will be described later on, by continuing the data erasing process using the erasing process information before another person boots the PC 12 to start up the OS.

Furthermore, if the result of the determination in step S44 is affirmative, i.e., if the "00H" written sector is the last sector of the area to be erased, because of the erasing process being all completed, the hard disk initialization flag written to the NVRAM 28 in step S40 is deleted (step S56). Moreover, after a shutdown flag is written to the NVRAM 28 (step S58), the PC 12 is shot down (step S50).

(Flow of Erasing Process when Rebooting PC Side)

Figure 5:
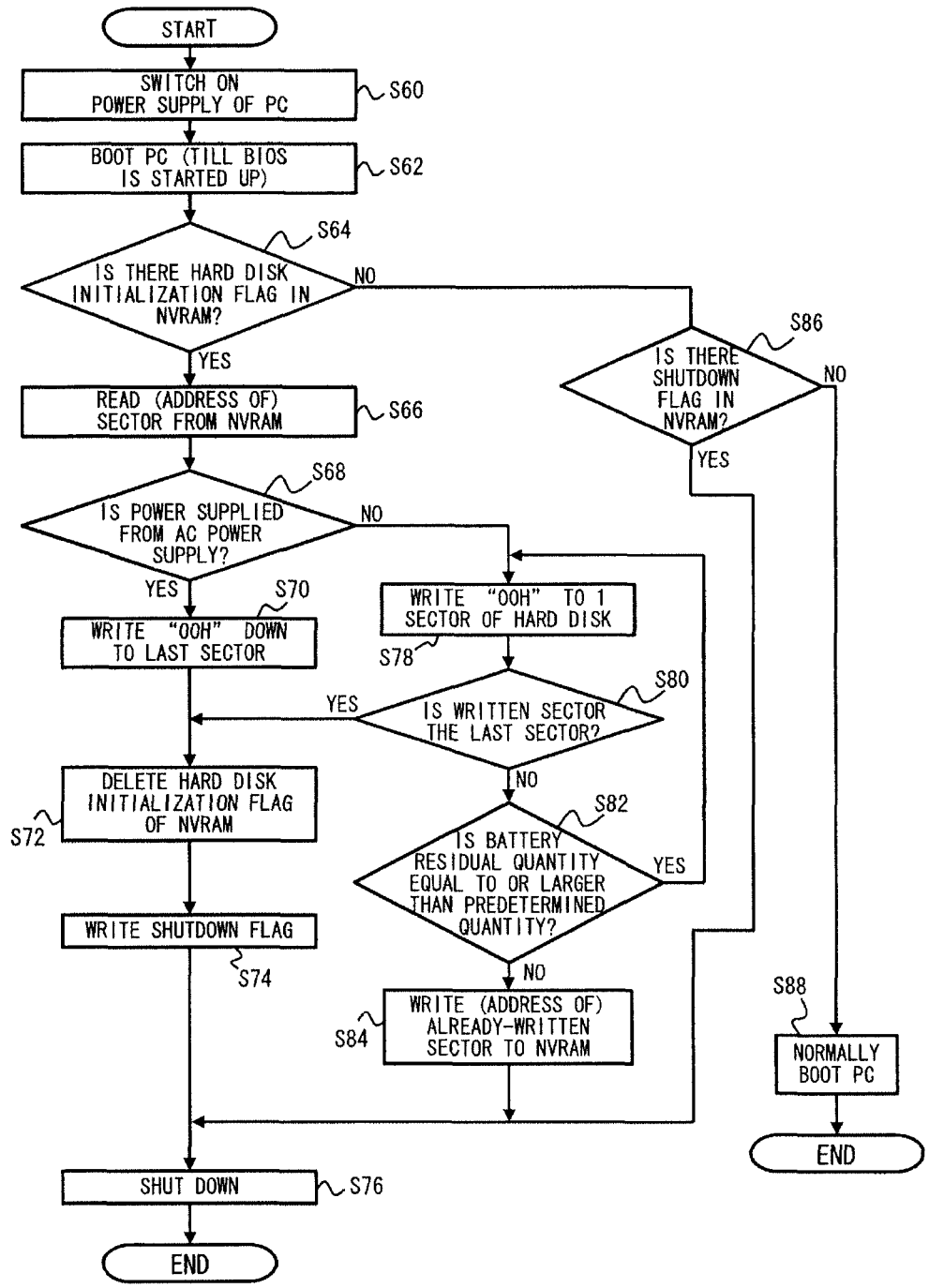
FIG. 5 is a flowchart illustrating a flow of a second half of the erasing process executed within the notebook PC depicted in FIG. 1.
Figure 6:
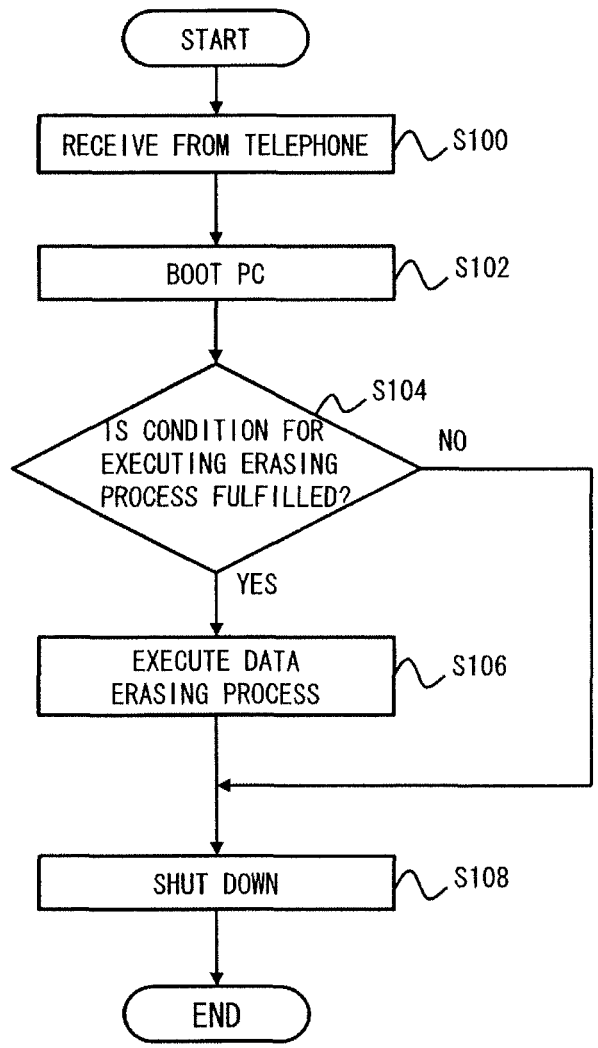
FIG. 6 is a flowchart showing a simplified illustration of a flow of a conventional data erasing process method.

Next, when the PC 12, which is shut down by executing the process shown in FIG. 4, is rebooted upon receiving the supply of the power, the erasing process is re-executed. FIG. 5 is a flowchart illustrating a flow of the erasing process that is re-executed at this time. This process is conducted without starting up the OS when another person boots the PC 12 by sufficiently ensuring the battery residual quantity.

To begin with, the PC 12 is powered ON (step S60), and, along with this, the system controller 26 reads the BIOS from the ROM 30, thus booting the PC 12 (step S62). At this time, it does not happen that the system controller 26 reads the OS to boot the PC. The BIOS includes, as described above, the erasing program for executing the erasing process in addition to the program containing a description of the procedures for accessing the device hardware such as the data storage unit 22 including the hard disk and the NVRAM 28. This erasing program is read and started up at the final stage of reading the BIOS, and the following process is initiated.

At first, it is determined whether the hard disk initialization flag is written to the NVRAM 28 or not (step S64). If the result of the determination is affirmative, the address information of the sector, which is written as the erasing process information to the NVRAM 28, is read out (step S66). This address information is a piece of address information of the already-written sector in step S48 shown in FIG. 4. Note that if the PC 12 is shut down after deleting the partition information in step S52, since there is no address information of the already-written sector, the address information of the already-written sector is not written to the NVRAM 28, however, the address information of the first sector not yet undergoing the erasing process is written as the erasing process information in step S54. Accordingly, if the PC 12 is shut down after deleting the partition information in step S52, the address information written as the erasing process information is dealt with as the address information of the first sector not yet undergoing the erasing process, and "00H" is written on the sector-by-sector basis which will be hereinafter carried out.

Next, it is determined whether or not the power supply unit 24 is supplied with the power from the AC power supply, i.e., supplied with the power by use of the AC power supply defined as the external power supply (step S68). If the result of this determination is affirmative, "00H" is written in sequence down to the last section of the hard disk on the sector-by-sector basis, and the data is erased (step S70). Thereafter, the hard disk initialization flag written to the NVRAM 28 is deleted (step S72). It can be thereby known that all the data in the hard disk has been erased. Thereafter, the shutdown flag is written to the NVRAM 28 (step S74), thereby shutting down the PC 12.

Whereas if the result of the determination is negative in step S68, i.e., if the power of the power supply unit 24 is supplied not from the AC power supply but from the external power supply, "00H" is written to the hard disk on a per sector basis (step S78). Upon finishing the writing on the per sector basis, it is determined whether the sector undergoing implementation of the writing at the present is the last sector of the shall-be-erased area or not (step S80). If the result of the determination is affirmative, the processing proceeds to steps S72, S74 and S76. Whereas if the result of the determination is negative, it is determined whether or not the internal battery of the power supply unit 24 has the residual quantity equal to or larger than the predetermined quantity enough to enable "00H" to be written to one sector (step S82). If the result of this determination is affirmative, the processing further loops back to S78, in which "00H" is written on the sector-by-sector basis. Thus, till the sector to which "00H" is written reaches the last of the shall-be-erased sectors, or till the battery residual quantity of the internal battery of the power supply unit 24 becomes smaller than the predetermined quantity, "00H" is repeatedly written on the sector-by-sector basis.

Whereas if the result of the determination is negative in step S82, the erasing process can not continue any further, and the address information of the "00H" already-written sector is written to the NVRAM 28 (step S84). Thereafter, the PC 12 is shut down (step S76). In this case, when the PC 12 is rebooted in the status where the power supply unit 24 has the sufficient power, the erasing process continues again from step S60.

Note that if the result of the determination is negative in step S64, it is further determined whether the shutdown flag is written to the NVRAM 28 or not (step S86). If the result of the determination is affirmative, the PC 12 is shut down (step S76). Whereas if the result of the determination is negative, the OS is read from the data storage unit 22 and is thus started up, resulting in the normal startup status (step S88).

Thus, the shall-be-erased area of the hard disk stored with the data is determined corresponding to the battery residual quantity of the internal battery of the power supply unit 24, then the erasing process of erasing the data in this determined area is controlled and executed, and the PC 12 is shut down after executing the erasing process. At this time, if the internal battery of the power supply unit 24 is determined to have the sufficient battery residual quantity in step S38, the erasing process is executed with respect to not only the area stored with the partition information but also other data areas within the partition. If the internal battery of the power supply unit 24 has no sufficient battery residual quantity, the erasing process is conducted with respect to the area recorded with the partition information. In any case, the area of the partition information is the first to undergo the erasing process, and hence it does not happen that the read-enabled status occurs without erasing a part of the data stored in the memory of the hard disk due to the battery residual quantity.

Moreover, in case of the battery residual quantity being deficient, the erasing process discontinues midways, the PC 12 is shut down, and, thereafter, at the point of time when ensuring the sufficient battery residual quantity, the erasing process continues by use of the erasing process information, thereby making it possible to erase all the data stored in the memory of the hard disk.

Furthermore, when erasing all the data in the hard disk, the shutdown flag is written to the NVRAM 28, and hence the OS of the PC 12 is disabled from starting up, with the result that the data in the data storage unit 22 can not be read by another person.

The processing flow of the PC 12 described above is executed by employing the erasing program including at least the following procedures executed by the PC 12 itself.

Namely, the erasing program includes prescriptions of:
(1) a procedure of making the communication module 20 receive the predetermined information for erasing the data in the memory of the data readable/writable hard disk from the mobile phone 14; and
(2) a procedure of making, when receiving this information, the system controller 26 set the area from which to erase the data stored in the memory of the hard disk, and control and execute the erasing process of erasing the data of this area in a way that corresponds to the battery residual quantity of the internal battery of the power supply unit 24.

This program is, as described above, stored in the ROM 30 and is read and executed as the BIOS. Further, the erasing process is provided via a storage medium storing with this program.

The embodiment discussed so far relates to the remote operation in the erasing process of the PC 12 by use of the mobile phone 14 but can involve employing a device capable of the remote operation as a substitute for the mobile phone 14. For instance, the PC 12 can be remotely operated by utilizing the Internet etc from the computer possessed by the owner. The erasing process program written as the BIOS to the ROM 30 in the embodiment may be written to a separately provided hard disk and SSD (flash memory drive) that are different from the hard disk of the readable/writable data storage unit 22. In this case, the erasing process program is read and executed before starting up the OS. Further, as in the embodiment, the flag representing that the erasing process is in the process of being executed, the shutdown flag and the sector address information are written to the NVRAM 28 but may also be, in addition to this case, written to the flash ROM and the separately-provided hard disk different from the data storage unit 22. An acceptable requirement is that the information remains even in such a status that at least the power supply is cut off and the reading and the writing can be done before starting up the OS.

First Modified Example

In the embodiment, the erasing process is executed by starting up the erasing program that is read as the BIOS. According to this BIOS, however, the PC 12 can be configured so as to select any one of the erasing program and the shutdown program for forcibly shutting down the PC 12 before starting up the OS and execute the selected program. Namely, it is feasible to select the operation of forcibly shutting down the PC 12 before starting up the OS. The shutdown program is selectively executed, whereby the OS of the PC 12 is disabled from starting up as far as the ROM 30 to which the BIOS is written is changed, and the data can be prevented from leaking out and flowing out as well.

The setting for thus selecting any one of the erasing program and the shutdown program is done by the owner who inputs an instruction beforehand in the way of using the PC 12 before the PC 12 may be stolen. In the case of selecting the shutdown program, the shutdown program is preferentially read and executed upon receiving the notification of the telephone number information from the owner's mobile phone 14 after being stolen.

Second Modified Example

In the embodiment, the erasing process is done with respect to the data area within the partition (s) into which the hard disk is partitioned, however, the predetermined partition remains intact, and the erasing process can be executed with respect to the partitions other than this predetermined partition.

Specifically, at first, the partitions excluded from the erasing process target partition even when the erasing process is performed are previously set and stored in the NVRAM 28. These partitions are set by the owner who inputs the instruction beforehand via the PC 12.

During the erasing process, in steps S42, S52 and further in steps S70, S78, the process is carried out so as to inhibit the partition information from being deleted and "00H" from being written to the data area with respect to each of the partitions excluded from the erasing process target partition. Only the intra-partition data desired by the owner to remain intact can be thereby left.

Third Modified Example

In the embodiment, the data stored in the hard disk is all deleted without any distinction between the partitions, however, the partition data can be also erased in a predetermined sequence of the partitions.

To be specific, at first, when the NVRAM 28 undergoes the execution of the erasing process, the sequence of the partitions subjected to the execution of the erasing process is preset and stored. This sequence of the partitions is set by the owner who previously inputs the instruction via the PC 12.

During the erasing process, in steps S42, S54 and further in steps S70, S78, "00H" is written to the sectors according to the predetermined sequence of the partitions. The data can be thereby erased in sequence from the partition desired by the owner to be erased sooner than others. With this contrivance, it is feasible to preferentially erase the data of the portion, which is desired to be prevented from leaking out and flowing out at the earliest possible stage.

The in-depth descriptions of the arithmetic processing device, the data erasing method, the program, the storage medium and the remote operation system have been made so far, however, the present invention is not limited to the embodiment discussed above and can be, as a matter of course, improved and modified in a variety of forms within the range that does not deviate from the gist of the present invention.

The above embodiment provides an arithmetic processing device mounted with a hard disk and a readable/writable memory such as a flash memory and capable of surely erasing data stored in the memory, a data erasing method of surely erasing the data in this memory, a program for surely erasing the data in the memory, a storage medium thereof and a remote operation system which certainly erases, through a remote operation, the data in the memory.

In the above embodiment, the data stored in the memory can be surely erased. With this contrivance, even if the arithmetic processing device is stolen by another person or lost, it is feasible to prevent surely the stored data from leaking and flowing out.

What is claimed is:
1. A portable arithmetic processing device, comprising:
    a communication control unit to receive predetermined information transmitted from an external device;
    a data storage unit to include a first data readable/writable memory;

a power supply unit to drive the arithmetic processing device; and a control unit to determine, when receiving the predetermined information, an area in which the data stored in the first memory shall be erased corresponding to a battery residual quantity of the power supply unit and to control and execute a data erasing process with respect to the thus-determined area, wherein the first memory is configured to be partitioned into a plurality of partitions, the control unit selects and implements any one of a first processing mode of executing the erasing process in a way that determines an area recorded with partition information in the first memory as the shall-be-erased area and a second processing mode of executing the erasing process in a way that determines data area within the partition as the shall-be-erased area, and the control unit implements the first processing mode if the battery residual quantity is smaller than a fixed quantity, and implements the second processing mode if the battery residual quantity is equal to or larger than the fixed quantity, the control unit, when implementing the second processing mode, after erasing the partition information by executing the erasing process with respect to the area stored with the partition information of the first memory, executes the erasing process with respect to the data area within the partition of which the partition information is erased, further comprising a second data readable/writable nonvolatile memory, wherein the control unit, when performing the erasing process in the second processing mode, executes the erasing process on a per sector basis with respect to the data area within the partition, further determines whether the battery residual quantity of the power supply unit is equal to or larger than a predetermined quantity each time the erasing process is performed on the per sector basis, and writes the information kept during the execution of the erasing process and address information of an already-erased sector, as pieces of erasing process information, to the second memory when the battery residual quantity is smaller than the predetermined quantity, and terminates the erasing process midway in the second processing mode.

2. The arithmetic processing device according to claim 1, further comprising a second data readable/writable memory, wherein the control unit, when implementing the first processing mode, writes the information kept during execution of the erasing process and address information of a first data area within the partition of which the partition information is erased, as pieces of erasing process information, to the second memory.

3. The arithmetic processing device according to claim 1, wherein after the erasing process in the second processing mode has been terminated midway, when re-executing the erasing process and if the battery residual quantity is equal to or larger than the fixed quantity, the control unit performs the erasing process in the second processing mode with respect to the data area which does not yet undergo the erasing process by use of the erasing process information.

4. The arithmetic processing device according to claim 1, further comprising a third memory stored with BIOS (Basic Input Output System), wherein the first memory is stored with OS (Operating System) of the arithmetic processing device, and the control unit, after reading the BIOS from the third memory and starting up the BIOS, executes the erasing process without starting up the OS.

5. The arithmetic processing device according to claim 4, wherein the control unit selectively determines a shall-be-erased target partition from within the plurality of partitions, and executes the erasing process with respect to the thus-determined partition.

6. The arithmetic processing device according to claim 4, wherein the control unit selectively implements any one of an erasing mode of executing the erasing process corresponding to information received by the communication control unit and a shutdown mode of shutting down the arithmetic processing device before starting up the OS corresponding to the information received by the communication control unit.

7. A data erasing method of erasing data in a first readable/writable memory mounted on an arithmetic processing device, comprising:

receiving, by the arithmetic processing device, predetermined information from an external device;

determining, by a control unit of the arithmetic processing device, when receiving the predetermined information, an area in which the data stored in the first memory shall be erased corresponding to a battery residual quantity of the arithmetic processing device and controlling and executing a data erasing process with respect to the thus-determined area, wherein the control unit, when controlling and executing the erasing process, implements a first processing mode of executing the erasing process in a way that determines an area stored with partition information in the first memory as the shall-be-erased area if the battery residual quantity is smaller than a fixed quantity, and implements a second processing mode of executing the erasing process in a way that determines data area within the partition as the shall-be-erased area if the battery residual quantity is equal to or larger then the fixed quantity, the control unit, when implementing the second processing mode, after erasing the partition information by executing the erasing process with respect to the area stored with the partition information of the first memory, executes the erasing process with respect to the data area within the partition of which the partition information is erased, the control unit, when performing the erasing process in the second processing mode, executes the erasing process on a Per sector basis within the partition, further determines whether the battery residual quantity is equal to or larger than a predetermined quantity each time the erasing process is performed on the Per sector basis, and writes the information kept during the execution of the erasing process and address information of an already-erased sector, as pieces of erasing process information, to the second data readable/writable nonvolatile memory when the battery residual quantity is smaller than the predetermined quantity, and terminates the erasing process midway in the second processing mode.

8. The data erasing method according to claim 7, wherein the control unit, when implementing the first processing mode, writes the information kept during execution of the erasing process and address information of a first data area within the partition of which the partition information is erased, as pieces of erasing process information, to the second data readable/writable nonvolatile memory.

9. The data erasing method according to claim 7, wherein after the erasing process in the second processing mode has been terminated midway, when re-executing the erasing process in the second processing mode and if the battery residual quantity is equal to or larger than the fixed quantity, the control unit performs the erasing process in the second processing mode with respect to the data area which does not yet undergo the erasing process by use of the erasing process information.

10. The data erasing method according to claim 7, wherein when the arithmetic processing device is supplied with power from an external power supply, the control unit selects and implements the second processing mode.

11. The data erasing method according to claim 7, wherein the erasing process is executed after starting up the BIOS (Basic Input Output System) provided in the arithmetic processing device without starting up OS (Operating System) of the arithmetic processing device.

12. The data erasing method according to claim 11, wherein the control unit selectively determines a shall-be-erased target partition from within the plurality of partitions, and executes the erasing process with respect to the thus-determined partition.

13. The data erasing method according to claim 11, wherein the control unit selectively determines and implements any one of an erasing mode of executing the erasing process corresponding to information received by an external device and a shutdown mode of shutting down the arithmetic processing device before starting up the OS corresponding to the information received by the communication control unit.

14. A non-transitory computer readable medium recorded with a program for making a computer execute:
- receiving, by a communication control unit of the computer, predetermined information for erasing data in a first data readable/writable memory mounted on the computer from an external device;
- controlling and executing, by control unit of the computer, a process of setting, when receiving the predetermined information, an area in which the data stored in the first memory shall be erased corresponding to a battery residual quantity of the computer and a data erasing process of erasing the data in the thus-set area, wherein the control unit, when controlling and executing the erasing process, implements a first processing mode of executing the erasing process in a way that determines an area stored with partition information in the first memory as the shall-be-erased area if the battery residual quantity is smaller than a fixed quantity, and implements a second processing mode of executing the erasing process in a way that determines data area within the partition as the shall-be-erased area if the battery residual quantity is equal to or larger then the fixed quantity, the control unit, when implementing the second processing mode, after erasing the partition information by executing the erasing process with respect to the area stored with the partition information of the first memory, executes the erasing process with respect to the data area within the partition of which the partition information is erased, the control unit, when performing the erasing process in the second processing mode, executes the erasing process on a Per sector basis within the partition, further determines whether the battery residual quantity is equal to or larger than a predetermined quantity each time the erasing process is performed on the Per sector basis, and writes the information kept during the execution of the erasing process and address information of an already-erased sector, as pieces of erasing process information, to the second data readable/writable nonvolatile memory when the battery residual quantity is smaller than the predetermined quantity, and terminates the erasing process midway in the second processing mode.

* * * * *

UNITED STATES PATENT AND TRADEMARK OFFICE
CERTIFICATE OF CORRECTION

PATENT NO. : 8,464,015 B2  
APPLICATION NO. : 13/233358  
DATED : June 11, 2013  
INVENTOR(S) : Kiyoshi Komatsu Page 1 of 1

It is certified that error appears in the above-identified patent and that said Letters Patent is hereby corrected as shown below:

In the Claims

In Col. 12, Line 37, In Claim 7, delete "then" and insert --than--, therefor.

In Col. 14, Line 14, In Claim 14, delete "then" and insert --than--, therefor.

Signed and Sealed this
Twelfth Day of November, 2013

Teresa Stanek Rea
*Deputy Director of the United States Patent and Trademark Office*